(12) United States Patent
Pyper (10) Patent No.: US 10,843,715 B2
(45) Date of Patent: Nov. 24, 2020

(54) REGENERATIVE RAILWAY BRAKING SYSTEM

(71) Applicant: Transnet SOC Limited, Pretoria (ZA)

(72) Inventor: Andreas Pyper, Pretoria (ZA)

(73) Assignee: Transnet Soc Limited, Pretoria (ZA)

( * ) Notice: Subject to any disclaimer, the term of this patent is extended or adjusted under 35 U.S.C. 154(b) by 354 days.

(21) Appl. No.: 15/563,600

(22) PCT Filed: Apr. 1, 2016

(86) PCT No.: PCT/IB2016/051876
§ 371 (c)(1),
(2) Date: Oct. 1, 2017

(87) PCT Pub. No.: WO2016/157146
PCT Pub. Date: Oct. 6, 2016

(65) Prior Publication Data
US 2018/0086355 A1  Mar. 29, 2018

(30) Foreign Application Priority Data

Apr. 2, 2015 (ZA) .................................. 2015/02292

(51) Int. Cl.
*B61H 9/06* (2006.01)
*F16D 61/00* (2006.01)
(Continued)

(52) U.S. Cl.
CPC ................ *B61H 9/06* (2013.01); *B60L 50/30* (2019.02); *B60T 13/586* (2013.01); *F16D 61/00* (2013.01);
(Continued)

(58) Field of Classification Search
CPC ........... B61H 9/06; B60T 13/586; B60T 1/10; B60T 8/1705; B60T 7/128; F16D 61/00; B60L 50/30; B60L 2200/26; Y02T 90/16; F16H 37/021; F16H 15/36; F16H 9/12; F16H 15/30
See application file for complete search history.

(56) References Cited

U.S. PATENT DOCUMENTS 4,098,144 A * 7/1978 Besel ..................... B60K 6/105
180/165
4,319,655 A    3/1982 Hoppie
(Continued)

FOREIGN PATENT DOCUMENTS

GB    2425290       10/2006
GB    2425290 A  * 10/2006 ............. B60K 6/105

OTHER PUBLICATIONS

International Preliminary Report on Patentability, PCT/IB2016/051876, filed Apr. 1, 2016, 6 pages.

*Primary Examiner* — Jeffrey C Boomer
(74) *Attorney, Agent, or Firm* — Myers Wolin, LLC (57) ABSTRACT

This invention concerns a regenerative braking system for installation on a bogie of a railway vehicle. The regenerative system includes an energy storage system for storing energy in mechanical or kinetic form, a transmission system and a control unit. The transmission system is selectively operable between different modes including a braking mode in which it transmits mechanical or kinetic energy from an axle of the bogie to the energy storage system and a drive mode in which it transmits mechanical or kinetic energy from the energy storage system to the axle of the bogie. The control unit is, in use, in communication with a prime mover of the train and the transmission system so as to receive control signals from the prime mover and automatically operate the mode of the transmission system in response to the control signals. The invention also concerns a railway bogie including a regenerative braking system, a regenerative energy management system and a method of operating the regenerative braking system.

24 Claims, 7 Drawing Sheets

(51) Int. Cl.
  B60T 13/58  (2006.01)
  B60L 50/30  (2019.01)
  F16F 15/30  (2006.01)
  *F16H 9/12*  (2006.01)
  *F16H 15/36*  (2006.01)
  *F16H 37/02*  (2006.01)

(52) U.S. Cl.
  CPC ........... *B60L 2200/26* (2013.01); *F16F 15/30* (2013.01); *F16H 9/12* (2013.01); *F16H 15/36* (2013.01); *F16H 37/021* (2013.01); *Y02T 90/16* (2013.01)

(56) References Cited

U.S. PATENT DOCUMENTS

| | | | |
|---|---|---|---|
| 7,624,830 B1* | 12/2009 | Williams | ............... B60K 6/105 |
| | | | 180/165 |
| 8,789,472 B2 | 7/2014 | Mai | |
| 2006/0106521 A1* | 5/2006 | Nasr | ........................ B60K 6/46 |
| | | | 701/82 |
| 2008/0128562 A1* | 6/2008 | Kumar | .................... B61L 3/006 |
| | | | 246/186 |
| 2010/0063646 A1* | 3/2010 | Ibaiondo Madariaga | ................... B60M 3/06 |
| | | | 700/297 |
| 2010/0282122 A1* | 11/2010 | Mai | ......................... B60L 7/10 |
| | | | 105/1.4 |
| 2010/0305792 A1* | 12/2010 | Wilk | ........................ B60K 6/46 |
| | | | 701/22 |
| 2013/0238213 A1* | 9/2013 | Jensen | .................. B60K 6/105 |
| | | | 701/99 |
| 2015/0336474 A1* | 11/2015 | Okaniwa | .................. H02J 7/14 |
| | | | 307/10.6 |
| 2016/0347204 A1* | 12/2016 | Takigawa | ............... B61L 3/006 |

* cited by examiner

REGENERATIVE RAILWAY BRAKING SYSTEM

CROSS-REFERENCE TO RELATED APPLICATION

This application is a 35 U.S.C. 371 application of PCT/IB 20161051876, filed Apr. 1, 2016, and titled "Regenerative Railway Braking System," which claims priority to South African Patent Application No. 2015/02292, filed Apr. 2, 2015, and titled "Regenerative Railway Braking System," the contents of which are incorporated herein by reference in their entireties.

BACKGROUND TO THE INVENTION

This invention relates to a regenerative railway braking system. In particular, but not exclusively, the invention relates to a distributed mechanical regenerative braking system for railway wagons.

A typical freight train has a number of locomotives which serve as the prime mover and rolling stock in the form of coaches or freight wagons. The number of wagons in a train varies significantly and some could include more than 300. Each wagon has a number of bogies which include wheels running on the rail. Typical wagon wheels are non-powered and provide no tractive effort to the train. They do however contain brake systems to improve the overall braking of the train. It is well-known that the energy generated during traditional braking operations is dissipated in the form of heat and noise and that it is desirable rather to capture this energy for re-use. This would result in meaningful energy savings and would also reduce the strain on certain components of a train. In a large railway network the energy savings provided by an efficient regenerative braking system would translate into substantial financial savings. The advantages of regenerative braking systems are well-known and a range of different solutions in a number of different applications have already been proposed.

One known type of regenerative braking system converts mechanical energy into electrical energy for storage in a storage unit. When required, the braking system converts the electrical energy back into mechanical energy, typically to be applied at the drive shafts of the bogie on which the braking system is installed. An example of such a regenerative braking system is described in the specification of U.S. Pat. No. 8,789,472. The system described in this prior art specification comprises an energy storage system (ESS) to receive, store and deliver energy upon request, a motor/generator that converts electrical energy into mechanical energy and vice versa, and an electrical converter which converts electrical energy supplied or received by the ESS into voltage and current adapted for the supply or recovery of the motor/generator energy. One disadvantage of this known system is that it requires continuous conversion of energy between electrical and mechanical form and vice versa. The result of this is that the system is relatively complex and requires electrically operable components to be installed on each bogie on which the braking system is installed. This not only increases the capital expense of installing such a system across a railway network but also increases maintenance and operational costs.

Another type of regenerative energy management system that has been proposed stores energy in the form of pressurised hydraulic fluid. Such a system is described in the specification of WO 2004/026657. This system includes energy accumulation means operable to store and release energy through controlled receipt and release of pressurised hydraulic fluid, a positive displacement fluid pump/motor and a low pressure hydraulic reservoir. The positive displacement pump/motor assembly has a drive shaft for connection to at least one of the wheels of the bogie. In a braking mode the pump/motor assembly retards the associated wheel by pumping hydraulic fluid into the accumulation means while in a driving mode it supplies supplementary power using hydraulic fluid from the accumulation means. In this system only the pump/motor assembly is installed on the bogie of the railway wagon while the rest of the equipment such as the energy accumulator is installed on the railway wagon carrying the bogie on which the pump/motor assembly is installed. This installation is again complex and required a network of hydraulic components to be installed on the railway wagon. The system is also expensive to install and has significant operational and maintenance costs.

A simplified mechanical system has been proposed and an example of such a system is described in the specification of GB 2 425 290. This prior art specification describes a system in which a flywheel and an internal combustion engine or an electrical motor with a power source, are installed on a bogie of a railway wagon. A reduction gearbox, a number of hydrostatic converters, clutches and an output shaft coupled to the axles of the bogie are also included in order to transfer power from the engine or motor to the flywheel and ultimately to the wagon wheels. This proposed system is merely a mechanical energy storage system to store energy provided by the engine or motor for use later. This system does not allow for regenerative braking and the flywheel is simply powered by the engine or motor installed on the bogie.

It is an object of this invention to alleviate at least some of the problems experienced with existing regenerative energy management systems.

It is a further object of this invention to provide a regenerative braking system that will be a useful alternative to existing systems.

SUMMARY OF THE INVENTION

In accordance with a first aspect of the invention there is provided a regenerative braking system for installation on a bogie of a railway vehicle, the regenerative system including:
 an energy storage system for storing energy in mechanical or kinetic form;
 a transmission system which is selectively operable between different modes including a braking mode in which it transmits mechanical or kinetic energy from an axle of the bogie to the energy storage system and a drive mode in which it transmits mechanical or kinetic energy from the energy storage system to the axle of the bogie; and
 a control unit which is, in use, in communication with a prime mover of the train and the transmission system so as to receive control signals from the prime mover and automatically operate the mode of the transmission system in response to the control signals.

The railway vehicle may be a non-powered vehicle, preferably a railway wagon.

The transmission system may be in the form of a continuously variable transmission (CVT).

The regenerative braking system may include a transmission-to-axle link for transmitting mechanical or kinetic energy between the axle of the bogie and the transmission system. The transmission-to-axle link may be in the form of a drive chain, a belt and pulley arrangement or a set of gears.

In one embodiment of the system, the transmission-to-axle link may be in the form of a set of gears, one of which is fixed to the axle of the bogie so that it rotates in harmony with the axle and the other being carried on a first input/output shaft of the transmission system.

The regenerative braking system may include a clutch located on the first input/output shaft of the transmission system for engaging the transmission system and the set of transmission gears when the clutch is engaged and disengaging the transmission system from the set of transmission gears when the clutch is disengaged.

The energy storage system may include a flywheel.

In one embodiment of the system the flywheel is, in use, mounted on the same axle of the bogie as the transmission system such that the axis of rotation of the flywheel is coaxial with the axle of the bogie. The flywheel is preferably mounted on the axle of the bogie by means of a bearing assembly so that it is allowed to rotate independently from the axle of the bogie. In an alternative embodiment of the regenerative braking system the flywheel may, in use, be mounted on a shaft which is parallel to the axle of the bogie.

The regenerative braking system may include a transmission-to-energy storage system link. The transmission-to-energy storage system link may be in the form of a drive chain, a belt and pulley arrangement or a set of gears. In one embodiment of the system, the transmission-to-energy storage system link may be in the form of a set of gears, one of which is carried by the bearing assembly and the other being carried on a second input/output shaft of the transmission system.

The regenerative braking system may further include a clutch located on the second input/output shaft of the transmission system for engaging the transmission system and the transmission-to-energy storage system link when the clutch is engaged and disengaging the transmission system from the transmission-to-energy storage system link when the clutch is disengaged.

In accordance with a second aspect of the invention there is provided a railway bogie including a regenerative braking system according the first aspect of the invention installed on each axle of the bogie, wherein the braking systems are operable independently from one another.

In accordance with a third aspect of the invention there is provided a regenerative energy management system for a train having a prime mover and a number of railway wagons, the energy management system including a number of regenerative braking systems according to any one of claims 1 to 16 installed on each of the railway wagons, wherein the control units of the regenerative braking systems are independently in communication with the prime mover.

In accordance with a fourth aspect of the invention there is provided a method of operating a regenerative braking system including an energy storage system for storing energy in mechanical or kinetic form, a transmission system and a control unit for controlling the transmission system, the method including:
  receiving a control signal:
  switching between different modes of operation in response to the control signal, wherein the different modes includes the following:
    an isolation mode in which the transmission system is disengaged from an axle of a bogie and the energy storage system;
    a self-discharge mode in which the energy storage system is disengaged from the transmission system and energy is dissipated from the energy storage system;
    a braking mode in which the energy storage system is engaged with the transmission system in such a manner that a force is applied to the wheels of the bogie acting in a direction braking the bogie wheels, thereby charging the energy storage system;
    an idle mode in which the energy storage system is charged but not being charged further nor is it applying a tractive effort to the axle of the bogie; and
    a drive mode in which the energy storage system is engaged with the transmission system in such a manner that a force is applied to the wheels of the bogie acting in a direction driving the bogie wheels.

The isolation mode may be activated by a signal that detects failure or defects in any system component.

The self-discharge mode may be activated by a signal that detects a system component failure or by a signal that system components need to be shut down at the end of a journey.

In the self-discharge mode energy is preferably dissipated from the energy storage system by applying brakes to the energy storage system to dissipate energy as heat and noise.

The self-discharge mode may be deactivated by a speed sensor signal indicating that the energy storage system has discharged sufficiently.

The braking mode may be activated by a signal from the lead locomotive during braking.

The method may include maintaining the torque that is applied to the axle of the bogie during the braking mode by the regenerative braking system within a range ensuring that there is no slippage between the wheels of the bogie and the rail.

In one embodiment, the method may include monitoring the slippage by comparing wheel or axle rotational velocity with vehicle translational velocity. This embodiment may include reducing the torque being applied by the regenerative braking system during the braking mode if the axle speed velocity is larger than the vehicle translational velocity. The braking mode may be deactivated by a speed sensor signal indicating that the energy storage system is fully charged.

In an alternative embodiment, the method may include measuring the coupler forces of the railway wagon and deactivating the braking mode when the coupler force signal is within a predetermined range.

The idle mode may be activated by a signal that the train is coasting. Alternatively, the idle mode is activated when by a signal that the coupler forces are within a predetermined range.

The drive mode may be activated by a signal that power is required. Preferably, the signal indicating that power is required is received from the lead locomotive.

The method may further include maintaining the torque that is applied to the axle of the bogie during the driving mode by the regenerative braking system within a range ensuring that there is no slippage between the wheels of the bogie and the rail. In one embodiment, the method includes monitoring the slippage by comparing the vehicle translational velocity with the velocity determined from the axle speed of the bogie.

The method may also include reducing the torque being applied by the regenerative braking system during the driving mode if the axle speed velocity is larger than the vehicle translational velocity.

The driving mode may be deactivated by a speed sensor signal indicating that the energy storage system is fully discharged.

In an alternative embodiment the method may include measuring the coupler forces of the railway wagon and deactivating the driving mode when the coupler force signal is within a predetermined range.

BRIEF DESCRIPTION OF THE DRAWINGS

The invention will now be described in more detail, by way of example only, with reference to the accompanying drawings in which:

FIG. 3 illustrates the position of the regenerative braking system of FIG. 1 on a railway bogie wherein a perspective view is shown in FIG. 3(a) and a partial top view is shown in FIG. 3(b);

DESCRIPTION OF THE ILLUSTRATED EMBODIMENTS

Referring to the drawings, in which like numerals indicate like features, a non-limiting example of a first embodiment of a regenerative braking system in accordance with the invention is generally indicated by reference numeral 10.

In this specification the regenerative braking system 10 will be described as a railway regenerative braking system for use on a bogie of a railway vehicle. The word railway vehicle should be interpreted broadly to include both powered vehicles such as a prime mover and non-powered vehicles such as rolling stock in the form of coaches or freight wagons. It should therefore be understood that the invention is not limited for use on any particular type of railway vehicle. However, it is envisaged that the system 10 could be particularly useful on bogies of non-powered freight wagons or trailer coaches, for example. In this specification the word railway wagon should be interpreted to mean a trailer coach or a freight wagon. The system 10 is designed such that it can be installed on a single axle of a bogie, thereby allowing each axle to carry its own, independent regenerative braking system 10. It should therefore be clear that the regenerative braking system 10 is a distributed system in that it is distributed throughout the train. It is envisaged that the shafts of all or a majority of the bogies of the train could have a regenerative braking system 10 installed thereon so as to maximise the energy saving. It should be understood that the effect of the distribution of the braking systems 10 is that the total energy storage capacity is stored in the form of smaller packages which are distributed throughout the train instead of at a centralised location.

Figure 1:
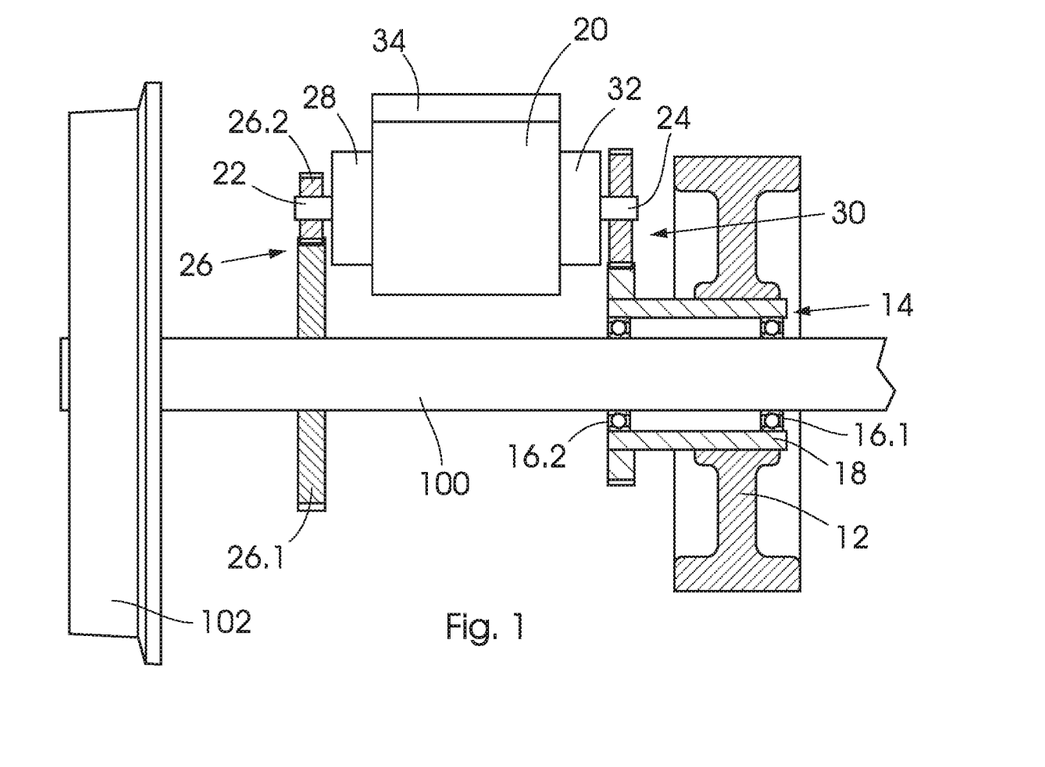
FIG. 1 shows a schematic illustration of a first embodiment of a generative braking system in accordance with the invention installed on an axle of a railway bogie.

Referring now in particular to FIG. 1, which shows a schematic illustration, the regenerative braking system 10 will be described in more detail. In this figure a portion of an axle of a railway bogie is indicted by the numeral 100 and a wheel carried on an end of the axle is indicated by the numeral 102. Although not shown in FIG. 1 it should be understood that a similar wheel is mounted on the other end of the axle and mounted thereon in such a manner that the two wheels turn in harmony.

The regenerative braking system 10 is shown installed on the axle 100. From this schematic representation it can be seen that the system 10 includes an energy storage system (ESS) for storing energy in mechanical or kinetic form. In the preferred embodiment of the system 10 the energy storage system includes a flywheel 12 which is mounted on the axle 100 by means of a bearing assembly 14. The bearing assembly 14 has two individual bearings 16.1 and 16.2 which are mounted co-axially on the axle 100 and which are spaced apart from one another. The two bearings 16.1 and 16.2 support a tubular shaft 18 mounted on them. In the preferred embodiment of the system 10 the flywheel 12 is mounted on the tubular shaft 18 in such a manner that they rotate in harmony. In other words, the flywheel rotates about its centre axis, which is also its axis of rotation and which is coaxial with the centre axis of the axle 100, when the tubular shaft 18 rotates and vice versa.

The braking system 10 further includes a transmission system 20 which is selectively operable between different modes in which it i) engages the axle 100 of the bogie, ii) engages the energy storage system, particularly the flywheel 12, iii) engages both the axle 100 and the energy storage or iv) is completely disengaged from both the axle 100 and/or the energy storage system. As a result, the transmission system 20 is selectively operable between different modes including a braking mode in which it transmits mechanical or kinetic energy from the axle 100 of the bogie to the energy storage system, particularly the flywheel 12, and a drive mode in which it transmits mechanical or kinetic energy from the energy storage system, particularly the flywheel 12, to the axle 100 of the bogie. More about the different modes of operation of the transmission system 20 is said below.

A person skilled in the art will know that the size of the flywheel 12 and the angular velocity at which it operates determine how much energy can be sorted in the flywheel. From experimental results the parameters as shown in Table 1 were obtained for the energy storage system 12. Although the energy capacity obtained through the experimental setup was about 1.4 kWh, it is envisaged that it could be anywhere between 1 and 3 kWh.

TABLE 1

| Energy Storage System Parameters | |
|---|---|
| Energy Capacity (kWh) | 1.3889 |
| Maximum Charge Rate (kW) | 28 |
| Average Charge Rate (kW) | 7.87 |

TABLE 1-continued

Energy Storage System Parameters

| | |
|---|---|
| Maximum Discharge Rate (kW) | 30 |
| Average Motor Rate (kW) | 7.56 |
| Average Brake Cycle Duration (S) | 298 |

Figure 2:
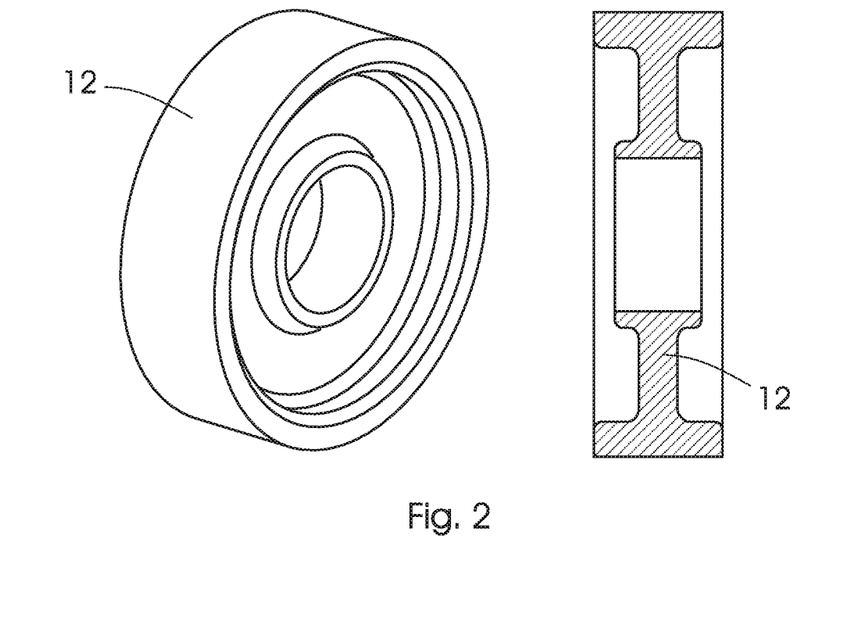
FIG. 2 shows the design of a flywheel of an energy storage system of the braking system of FIG. 1 wherein a perspective view is shown in FIG. 2(a) and a cross-sectional side view is shown in FIG. 2(b)

The above parameters were used to design the flywheel and the resultant flywheel specifications are provided in Table 2 below. The flywheel design is illustrated in FIG. 2.

TABLE 2

Flywheel specifications

| | |
|---|---|
| Flywheel Mass | 95 |
| Maximum Rotational Speed (rpm) | 14 000 |
| Minimum Rotational Speed (rpm) | 5000 |
| Maximum Kinetic Energy (kJ) | 6000 |
| Energy Return Capacity (kJ) | 5000 |

Based on the above parameters it is estimated that the maximum torque on the flywheel will be in the region of about 90 N.m. at a maximum angular acceleration of about 15.74 rad/s$^2$.

Returning now to FIG. 1, the transmission system 20 includes first and second input/output shafts indicated by the numerals 22 and 24 respectively. Depending on the mode of operation of the transmission system 20 each shaft 22, 24 could function as either an input shaft used to transfer energy to the transmission system or an output shaft used to transfer energy from the transmission system. The input/output shaft 22 is used to connect the transmission system 20 to the axle 100 of the bogie by means of a transmission-to-axle link 26. The transmission-to-axle link 26 is used for transmitting mechanical or kinetic energy between the axle 100 of the bogie and the transmission system 20 and could take any form of mechanical driving means. It is envisaged that the drive means could be a drive chain, a belt and pulley arrangement or a set of gears. In the schematic illustration of FIG. 1 the mechanical drive means is illustrated as a set of gears. In the illustrated embodiment of the system 10 one of the gears 26.1 is fixed to the axle 100 of the bogie so that it rotates in harmony with the axle while the other gear 26.2 is carried on the first input/output shaft 22 of the transmission system 20. It should be understood that rotation of the axle 100 causes rotation of the first gear 26.1 which, in turn, rotates the second gear 26.2 and accordingly the first input/output shaft 22.

A clutch 28 is located on the first input/output shaft 22 between the second gear 26.2 and the transmission system 20. In use, the clutch 28 is operable to engage the transmission system 20 and the transmission-to-axle link 26, i.e. the set of transmission gears 26 in the illustrated embodiment, when the clutch is in its engaged state and to disengage the transmission system 20 from the transmission-to-axle link 26 when the clutch is in its disengaged state.

Similarly to the transmission-to-axle link 26, the braking system 10 also includes a transmission-to-energy storage link 30 which is selectively operable to engage and disengage the transmission system 20 and the energy storage system. The transmission-to-energy storage link 30 is also referred to as a transmission-to-flywheel link in view of the fact that the energy storage system of the embodiment of FIG. 1 includes a flywheel 12. It is again envisaged that the transmission-to-flywheel link 30 could take the form of any mechanical drive means such as a drive chain, a belt and pulley arrangement or a set of gears, for example. In the schematic illustration of FIG. 1 the transmission-to-flywheel link 30 illustrated as a set of gears. A first gear 30.1 of the set of gears is mounted on the tubular shaft 18 in such a manner that it rotates in harmony with the tubular shaft. The first gear 30.1 will typically be fixed to the tubular shaft 18. A second gear 30.2 of the set of gears 30 is, in turn, carried on the second input/output shaft 24. It should be understood that rotation of the tubular shaft 18 causes rotation of the first gear 30.1 which, in turn, rotates the second gear 30.2 and accordingly the second input/output shaft 24.

A clutch 32 is also located on the second input/output shaft 24 between the second gear 30.2 and the transmission system 20. In use, the clutch 32 is operable to engage the transmission system 20 and the transmission-to-energy storage link 30, which is in this first embodiment of the invention a set of flywheel gears 30, when the clutch is in its engaged state and to disengage the transmission system 20 from the transmission-to-energy storage link 30 when the clutch is in its disengaged state.

To control the transfer of energy through the transmission system 20, i.e. to control the operation of the clutches 28 and 32, the braking system 10 includes a control unit 34. It is envisaged that the control unit 34 could, in use, be in communication with a prime mover of the train and the transmission system 20 so as to receive control signals from the prime mover and automatically operate the mode of the transmission system 20 in response to the control signals.

It is envisaged that the transmission system could include a continuously variable transmission (CVT) and a reduction gear set to compensate for the fact that the flywheel 12 will be rotating much faster than the axle 100. The CVT will vary the reduction ratio of the transmission to match the angular velocities of the input/output shafts 22, 24 and will also act as a torque converter. It is believed that the varying gear ratio provided by the CVT will be achieved through a variable-diameter pulley (VDP) system or a Toroidal variator system. In the event that the VDP system is used, the variation in the pulley diameter will be enforced by means of a linear actuator. The actuator will be controlled by the control unit 34 and will initially select a ratio to match the angular velocities of the input/output shafts 22, 24 to the transmission 20. The ratio of the CVT will then be varied in a way to either charge or discharge the energy storage system 12, depending on the mode of operation. It is believed that the CVT must be rated for a maximum power of 30 kW. In an alternative embodiment in which the Toroidal variator system is used, the angle of the contact rollers will be controlled instead by means of an actuator such as an hydraulic piston or stepper motor.

In view of the abovementioned flywheel parameters and assuming train speeds of between 20 km/h and 100 km/h, it is determined that the required transmission ratios of the CVT are between 1:8 and 1:100. These ratios could be achieved using a CVT in conjunction with two fixed ratio gear sets which links the two input/output shafts 22 and 24 with the axle 100 and the energy storage system, particularly the flywheel 12. If a limit on the CVT ratio of 1:8 is assumed, the maximum and minimum gear ratios will differ by a factor of 8. Due to this limiting factor the gear ratios that can be obtained from the transmission 20 will range from 1:10 to 1:80. This is achieved by using the CVT 20 with a gear ratio range between 1:1 and 1:8 in conjunction with two fixed reduction gear sets with a total reduction ratio of 1:10.

An example of a VDP CVT that could be used in the braking system 10 of the invention is currently being sold in the market under the trade mark Nissan Altima. It is believed that the efficiency of this CVT could between 85% and 92%. In the embodiment in which the Toroidal variator system is used, it is believed that a Toroidal variator such as those made by Ultimate Transmissions Pty Ltd operates with efficiencies between 92 and 97% with wider gear ratios than those of a VDP.

As mentioned above the control unit 34 of the system 10, 40, in use, switches the transmission system 20 between a number of different modes of operation in response to control signals received by it. The control signals are typically generated by either one of the prime movers hauling the railway wagon on which the particular brake system 10 is installed or by additional sensors. These signals are either submitted through signalling wires or wirelessly through radio frequency communications, for example. The control unit 34 will select the desired mode of operation based on the control signals received from the prime mover and/or sensors.

It is envisaged that, in use, the braking system 10 would be invisible to the driver of the lead locomotive and at the control unit will manage the regenerative braking system 10 by receiving the notch required by the driver, the vehicle translational velocity of the train, the coupler force of the wagon and the coupler force of the consist from the lead locomotive. It is further envisaged that the additional sensors could include heat sensors located at the bearing locations to detect bearing failure, speed sensors at the wheel axles of the wagon and a speed sensors to monitor the speed of each fly wheel. The control unit of the braking system 10 will receive signals from each of these additional sensors and will switch between the different modes of operation based on the information contained in the signals as well as the signals received from the locomotive.

It should be understood that the operation and control of the brake system 10 requires careful consideration to ensure that the system 10 runs as affectively as possible and does not cause damage to the rest of the train. It is imperative that the brake system 10 extract energy from the train at the correct times and that tractive effort, i.e. a force acting to drive the axle 100, is applied strategically by the system 10 to optimise energy efficiency in such a way that it does not induce slip between the wheels 102 and the rail. In order to operate efficiently it is envisaged that the braking system 10 could be operable between the following modes of operation:

i) Isolation Mode

In this mode the transmission system 20 is disengaged from the axle 100 of the bogie and the energy storage system 12. This mode is defined as the state in which the braking system 10 is when no control is provided to the system. The energy storage system 12 will not store any energy and the clutch 32 will disengage to isolate the energy storage system from the transmission 20. The input/output shaft 22 will also be disengaged from the transmission 20 by disengaging the clutch 28. It is envisaged that this mode can be activated by a signal from the lead locomotive or by any signal that detects failure or defects in any system component.

ii) Self-Discharge Mode

In this mode the energy storage system 12 is disengaged from the transmission system 20 and energy is dissipated from the energy storage system. This mode enables the release of energy from the energy storage system 12 without applying any tractive effort to the axle 100. It is envisaged that this could be done by applying brakes to the flywheel 12 which would result in the energy being dissipated as heat and noise. A speed sensor signal at the flywheel 12 will enable the control unit 34 to determine whether the system 10 has discharged sufficiently. The self-discharge mode will typically allow the braking system 10 to proceed to the isolation mode when it is needed. The self-discharge mode may be activated when failure is detected in a system component (similar to the isolation mode) or when the components or systems have to shut down, for example at the end of the train's journey.

iii) Braking Mode

In this mode the energy storage system 12 is engaged with the transmission system 20 in such a manner that a torque is applied to the wheels 102 of the bogie acting in a direction to brake the bogie wheels. During the braking procedure, the kinetic energy that is removed from the train is recovered and transferred to the flywheel 12 to increase the angular velocity of the flywheel. The brake system 10 will receive a control signal from the lead locomotive during braking. Both clutches 28 and 32 will engage when this signal is received. It should be understood that the torque being applied to the axle 100 must be within a certain range to ensure that there is no slip between the wheels 102 and the rail. To monitor the slip, the vehicle translational velocity will be compared with the velocity determined by the wheel or axle rotational velocity. If the axle speed velocity is larger than the vehicle translational velocity, the torque applied by the system 10 will be reduced or the system 10 will disengage.

It is envisaged that in an alternative embodiment, instead of comparing the vehicle translational velocity and axle speed velocity, the method of controlling the system 10 could comprise considering the forces in the coupler of the wagon. The brake mode will then be deactivated when the coupler force signal is within a certain, predefined range.

In this braking mode the speed of the flywheel 12 will increase until it reaches a speed at which the brake system 10 is fully charged. Once the signal from the flywheel speed sensor indicates that the flywheel 12 has reached this specific speed, the brake mode will be deactivated and the system 10 will return to an idle mode.

iv) Idle Mode

In this mode the energy storage system 12 is charged but not being charged further nor is the brake system 10 applying a tractive effort to the axle 100 of the bogie. The brake system 10 will typically reside in this mode when it receives a signal from the lead locomotive that the train is coasting. Alternatively, the coupler force signal mentioned in iii) above with reference to the alternative embodiment can be used to switch the brake system 10 to the idle mode when the coupler force is with a predetermined range.

v) Drive Mode

In this mode the energy storage system 12 is engaged with the transmission system 20 in such a manner that a torque is applied to the wheels 102 of the bogie acting in a direction to drive the bogie wheels. In use, the brake system 10 will receive a control signal from the lead locomotive when power is required. Both clutches 28 and 32 will engage when this signal is received. It should again be understood that the torque being applied to the axle 100 must be within a certain range to ensure that there is no slip between the wheels 102 and the rail. The slippage between the wheels 102 and the rail is monitored in the same manner as discussed above, i.e. by monitoring the vehicle translational velocity and axle speed velocity. If the axle speed velocity is larger than the vehicle translational velocity, the torque applied by the brake system 10 will be reduced or the system 10 will disengage.

It is again envisaged that in an alternative embodiment, instead of comparing the vehicle translational velocity and axle speed velocity, the method of controlling the system 10 could comprise considering the forces in the coupler of the wagon. The brake mode will then be deactivated when the coupler force signal is within a certain, predefined range.

In the drive mode the speed of the flywheel 12 will reduce until it reaches a speed at which the system is fully discharged. Once the signal from the flywheel speed sensor indicates that the flywheel has reached this specific speed, the drive mode will be deactivated and the system 10 will return to the idle mode.

It is also believed that the brake system 10 could act as an emergency drive in the event that the prime mover becomes disabled. This emergency drive mode will be substantially similar to the regular drive mode.

Figure 3A:
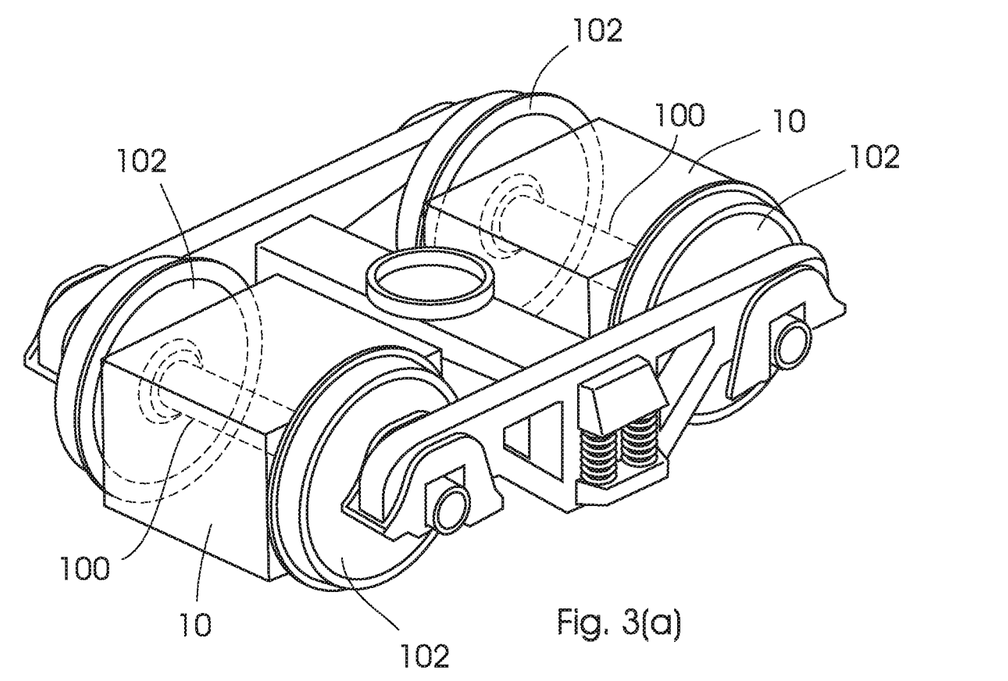
Figure 3B:
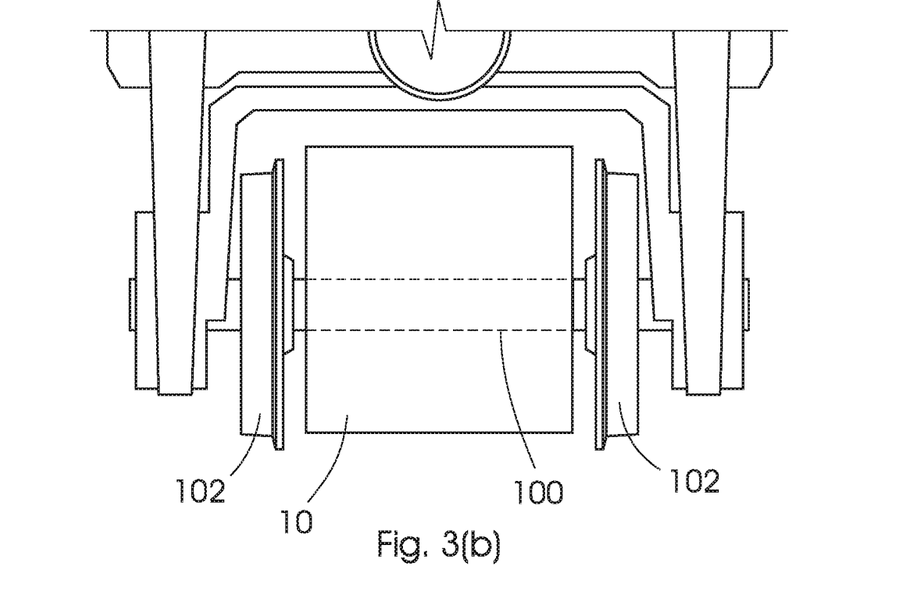

Now that the brake system 10 and its method of operation have been described in detail, it should be clear that a significant advantage of the braking system 10 is that it can be installed on each axle of the bogie. To illustrate this, the system 10 is illustrated as a compact unit in FIG. 3. From this figure it can be seen that a regenerative braking system 10 in accordance with the invention is installed between the two wheels 102 of each axle 100 of the bogie. The assembled unit will have mounting points by which it can be fixed to the bogie. In the preferred embodiment of the braking system 10 it is designed to have a life cycle which is greater than that of the bogie, thereby ensuring that under normal operating conditions the system 10 will not require any maintenance until the bogie is removed from the wagon. The inventors envisage a required system lifetime of 20 years.

From the above description it should be clear that a number of individual braking systems 10 could be included in a regenerative energy management system for a train which has a prime mover and a number of railway wagons. The braking systems 10 will typically be installed on wagons throughout the train so that energy could be recovered in or applied from the energy storage system 12 across substantially the entire train. The control units of the regenerative braking systems 10 are also independently in communication with the prime mover and/or the additional sensors. This allows the braking systems 10 to be operable independently from one another. The regenerative energy management system is therefore a distributed system, which is a significant advantage when compared to conventional regenerative systems.

Another advantage of the regenerative braking system 10 is that it is predominantly a mechanical system that stores energy in mechanical or kinetic form. Compared to the known regenerative braking systems the system 10 is significantly simpler and, accordingly, more cost effective to install, maintain and operate across a railway network.

It is further believed that the use of the regenerative braking system 10 could reduce the coupler forces, which is a significant advantage of the system 10. A person skilled in the art will appreciate that by reducing the coupler forces the overall length of the train can be increased which, in turn, has significant financial benefits.

Figure 4:
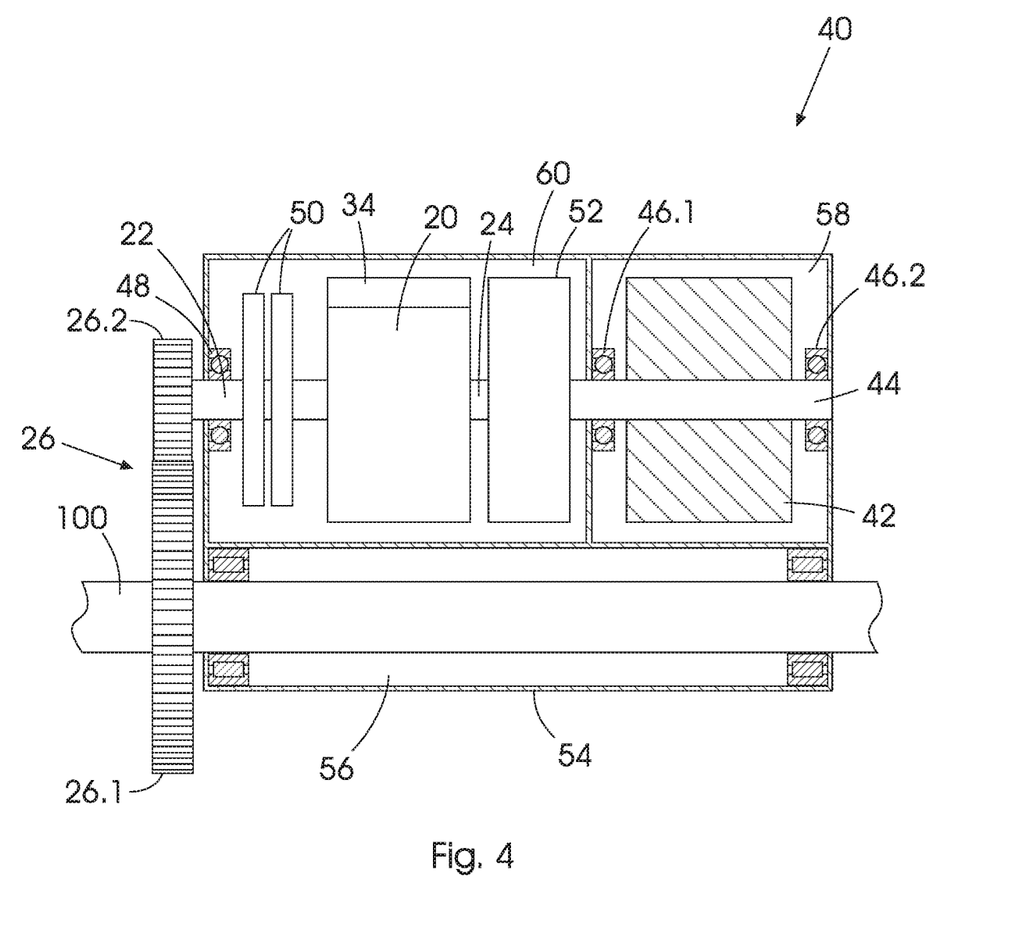
FIG. 4 shows a schematic illustration of a second embodiment of a generative braking system in accordance with the invention installed on an axle of a railway bogie.

Referring now to FIG. 4, a non-limiting example of a second embodiment of a regenerative braking system in accordance with the invention is generally indicated by reference numeral 40. In the accompanying drawings, like numerals indicate like features. The system 40 is substantially similar to the system 40 and, accordingly, the description above with reference to the system 10 applies insofar as possible to the system 40. The most significant difference between the system 10 and the system 40 is the location of its flywheel. It should be understood that the flywheel could be located in different positions on the bogie and is not limited to the two locations as indicated in the systems 10, 40 of FIGS. 1 and 4 respectively.

Similarly to FIG. 1, a portion of an axle of a railway bogie is indicated by the reference numeral 100. From the schematic representation it can be seen that the system 40 includes an energy storage system (ESS) for storing energy in kinetic/mechanical form. In this second embodiment of the system 40 the ESS again includes a flywheel 42. However, instead of being mounted coaxially with the bogie axle 100 like in the system 10 in accordance with the first embodiment of the invention, the flywheel 42 is mounted on a shaft 44. The flywheel 42 is mounted on the shaft 44 in such a manner that they rotate in harmony. As shown in FIG. 4, the shaft 44 runs parallel to the bogie axle 100 and is supported by bearings 46.1 and 46.2 to allow for rotation of the axle. The bearing 46.1 and 46.2 are located in the end regions of the shaft 44 on either side of the flywheel 42.

Similarly to the system 10 according to the first embodiment of the invention, the regenerative braking system 40 includes a transmission system 20 which is selectively operable between the different modes as set out above. The transmission system 20 of the system 40 is identical to the transmission system 20 of the system 10 and will therefore not be described in detail again.

Referring still to FIG. 4 it can be seen that the transmission system 20 again has first and second input/output shafts 22 and 24, which are substantially similar to the input/output shafts 22, 24 of the system 10. As mentioned above with reference to the system 10, each shaft 22, 24 could function as either an input shaft or an output shaft depending on the mode of operation of the transmission system 20.

In this second illustrated embodiment the input/output shaft 22, 24 are mounted coaxially with the shaft 44 on which the flywheel 42 is mounted. The input/output shaft 24 is connected mechanically to the shaft 44 while the input/output shaft 22 is supported by a bearing 48. This mechanical connection between the shafts 24 and 44 may have a gearing ratio between them. It is envisaged that the mechanical connection could be in the form of a set of gears, a belt and pulley system, a chain drive or any other mechanical connection capable of achieving the desired gearing ratio. In this second embodiment of the system 40 the mechanical connection between the input/output shaft 24 forms a transmission-to-flywheel link.

A clutch 50 is located between the transmission system 20 and the bearing 48, and is mounted coaxially with the input/output shaft 22. The clutch 50 is operable to connect and disconnect the transmission system 20 to a transmission-to-axle link 26 comprising the gears 26.1 and 26.2, thereby connecting and disconnecting the transmission system 20 to the bogie axle 100. The transmission-to-axle link 26 is identical to the transmission-to-axle link 26 of the system 10 and will therefore not be described in detail again. It should be understood that the transmission-to-axle link 26 is effectively operable to connect and disconnect the flywheel 42 to the bogie axle 100.

Although FIG. 4 showing the second embodiment of the system 50 only indicates one clutch 50 located on the shaft 22, it is envisaged that a second clutch could be located on the shaft 24 similar to the first embodiment of the system 10.

To control the transfer of energy through the transmission system 20, i.e. to control the operation of the clutch 50 as well as the gear ratio of the transmission system 20, the braking system 40 once again has a control unit 34. It is again envisaged that the control unit could, in use, be in communication with a prime mover of the train and the transmission system 20 so as to receive control signals from the prime mover and automatically operate the mode of the transmission system 20 in response to the control signals.

Similarly to the system 10, the transmission system could include a continuously variable transmission (CVT) and a reduction gear set to compensate for the fact that the flywheel 42 will be rotating much faster than the axle 100. In FIG. 4 the reduction gear set is indicated by the numeral 52. Again, the CVT will vary the reduction ratio of the transmission system 20 to match the angular velocities of the input/output shafts 22, 24 and will also act as a torque converter.

As illustrated in FIG. 4, the system 10 is located in an enclosure 54, which has three compartments indicated by the reference numerals 56, 58 and 60 respectively. The first compartment 56 houses at least of portion of the axle 100 of the bogie and at least some the bearing mounting the axle. The second compartment 58 houses the flywheel 42. It is envisaged that a vacuum could be created inside the second compartment 58. The third department 60 houses the clutch 50, transmission system 30 and the reduction gear set 52. It is envisaged that the clutch 50 could be a wet clutch.

In principle the operation of the system 40 is identical to that of the system 10 and will therefore not be described again in detail. However, it should be understood that minor changes have to be made to the operation of the system 40 in view of the change in configuration of the components thereof. The different modes of operation of the system 40 are identical to those of the system 10. However, the operation or controlling of the individual components in order to switch between the different modes varies slightly due to the change in configuration of the components. For example, in the system 40 the flywheel 42 is never disconnected completely from the transmission system 20. Therefore, the transmission system 20 will rotate in harmony with the flywheel 42. In other words, the transmission system 20 will constantly spin when the flywheel 42 is spinning but no torque will be transmitted at times when the clutch 50 is disengaged.

Prediction of System Efficiency and Energy Saving

The efficiency and possible energy saving of the brake system 10 are now theoretically predicted using the above-mentioned design parameters.

First Order Prediction

In order to determine the overall efficiency of the braking system 10, the transmission 20 and ESS 12 efficiencies will be combined. The losses associated with the transmission include the two fixed ratio gear sets, as well as the CVT efficiency and are determined to be 82.8% as seen in Table 3.

TABLE 3

Transmission Efficiency

| | |
|---|---|
| Fixed Gear Efficiency ($n_G$) | 97% |
| Average CVT Efficiency ($n_{CVT}$) | 88% |
| Transmission efficiency ($n_T = n_G * n_{CVT} * n_G$) | 82.8% |

Figure 5:
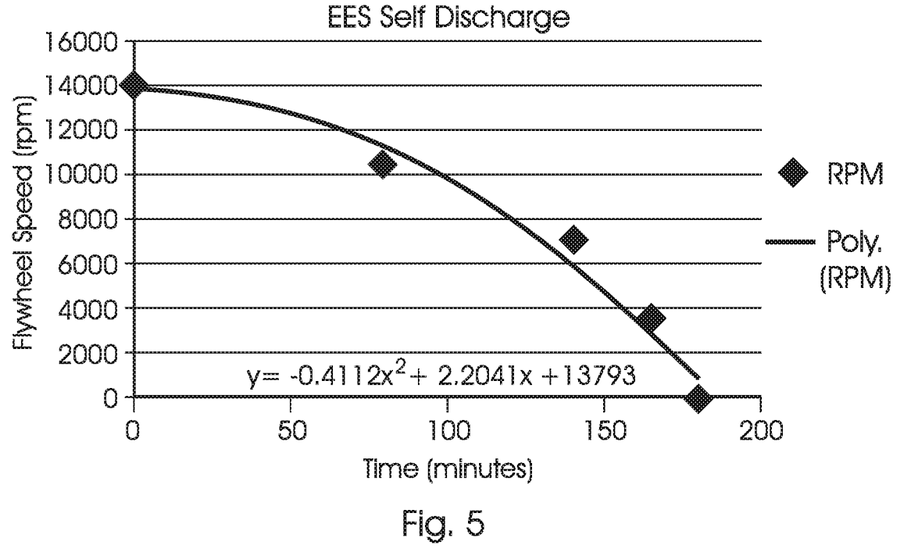
FIG. 5 shows a graph of the rotational speed of a flywheel of the system of FIG. 1 plotted against time, thereby indicating how the decrease in rotational speed of the flywheel is characterised and the quadratic equation that can be used to estimate the rotational velocity as a function of time.

The bearing losses and windage losses are the two main inefficiencies of the ESS. For the purpose of this study, an assumption is made that the ESS will self-discharge completely in a time of three hours and that the rotational speed of the flywheel will decrease in a quadratic manner. FIG. 5 shows how the decrease in rotational speed of the flywheel is characterised and the quadratic equation that can be used to estimate the rotational velocity as a function of time.

Figure 6:
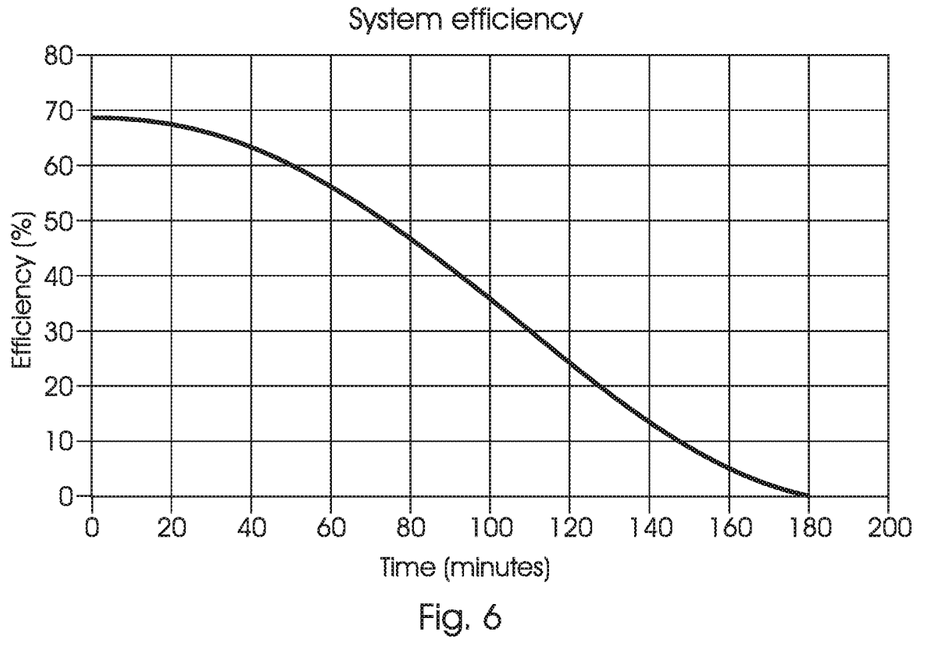
FIG. 6 shows the overall efficiency of the brake system as a function of the time that the energy is stored in the energy storage system (ESS) of the system of FIG. 1.

The parasitic self-discharge of the ESS means that the overall efficiency of the brake system decreases with time as energy as stored in the ESS. FIG. 6 shows the overall efficiency of the brake system as a function of the time that the energy is stored in the ESS, the overall efficiency of the system takes into account that energy will pass through the transmission twice.

Simulation

In order to calculate the required ESS capacity and the brake system efficiency previously, several assumptions had to be made to facilitate the calculations. The assumptions that were made may not be entirely accurate, but were necessary to provide first order results to understand the requirements of the invention better.

In order to predict more accurately the ESS capacity, brake system efficiency and the energy savings that the system will yield, an analysis of the available train data has to be done by simulation.

Simulation Algorithm

ESS—Charge and Discharge

The algorithm performing the simulation uses three input fields to perform the simulation; they are the time steps, applied power by the locomotive consist and the speed of the train. A set of parameters describing the brake system is also required. They include the ESS capacity, ESS self-discharge rate, the transmission efficiency and the number of brake systems in the train.

The simulation addresses the power requirement of the train for each time step in the trip data. It can then determine whether the train is currently in motoring or braking operation. If the train is in motoring operation; the algorithm checks if there is enough energy in the ESS to deliver the power and if so records that the power (or a percentage of the power) is delivered by the brake system and the ESS is discharged. The power that cannot be provided by the brake system is recorded to be provided by the prime mover (locomotive consist).

If the train is found to be in braking operation, the algorithm checks the charge level of the ESS. If the ESS is not fully charged, the braking is performed by the brake system and the ESS is charged. The charge level of the ESS is recorded throughout the simulation.

For the charging and discharging of the ESS, the transmission efficiency is incorporated by the algorithm. The algorithm also includes the self-discharge losses of the ESS whenever there is energy stored in the ESS.

Torque

The torque applied to the axle during motoring and braking operation is calculated throughout the simulation. Equation 1 is used and with the power (P) known, the rotational velocity of the axle ($\omega$) can be calculated by converting the speed of the train to rotational velocity with the known wheel contact diameter.

$$P = T \times \omega \qquad (1)$$

ESS Rotational Velocity

The rotational velocity of the flywheel can be calculated for each time step of the trip by converting the energy value of the charge level of the ESS to the rotational velocity by using Equation 2.

$$E = \tfrac{1}{2} \times m \times \omega^2 \qquad (2)$$

The resulting angular velocity obtained from Equation 2 will have units of rad/s which can then easily be converted to rpm.

Overall Gear Ratio

With the rotational velocities of both the axles of the wagons and the flywheel of the ESS known, it is possible to calculate the total gear ratio for the transmission throughout the trip. Equation 3 is used to do this.

$$GR = \frac{\omega_{flywheel}}{\omega_{axle}} \quad (3)$$

Energy Savings and Brake System Efficiency

To determine the amount of energy that is delivered to the train by the combination of all the brake systems the energy that is applied as tractive energy from the ESS is tracked at each time step. The sum of the applied tractive energy for each time step provides the total energy delivered by the brake system. This result is the amount of energy that is saved by the implementation of the brake system, as this energy would have been provided by the prime mover in the absence of the brake system.

The fraction of energy provided by the prime mover over the total energy required, as well as the fraction representing the saving in energy (energy provided by the brake system) is then calculated by the algorithm.

Simulation Results

The trip that was analysed and simulated is a trip between Johannesburg City Deep to Umbilo in Durban. The trip covers a distance of 644.19 km and takes 15 h 22 min to complete. At this stage the variation of installing either one or two brake systems is introduced in each wagon bogie. The simulation is performed twice to investigate what effect this will have. The characteristic parameters of the ESS for the two simulations are given in Table 4 below.

TABLE 4

Braking System Parameters

| Parameter | Scenario 1 | Scenario 2 |
|---|---|---|
| Number of Wagons | 50 | 50 |
| Number of braking systems per Bogie | 2 | 1 |
| Number of braking systems per Wagon | 4 | 2 |
| Energy Capacity per braking system | 1.389 kWh | 2.222 kWh |
| ESS Self Discharge Time | 120 min | 120 min |
| Self-discharge Rate per braking system | 854.8 W | 1164 W |
| Transmission Efficiency | 82.8% | 82.8% |

TABLE 5

Energy Related Trip results

| Parameter | Scenario 1 | Scenario 2 |
|---|---|---|
| Total Motoring Energy Required | 15 063 kWh | 15 063 kWh |
| Energy Provided by Prime Mover | 11 526 kWh (76.6%) | 11 473 kWh (75.54%) |
| Energy Saved | 3 528 kWh (23.4%) | 3 590 kWh (24.30%) |
| Energy Recovered by Single braking system | 17.64 kWh | 35.90 kWh |
| Fraction of Braking Energy Captured | 63.97% | 56.53% |
| Overall Brake System Efficiency | 46.62% | 54.75% |

Figure 7:
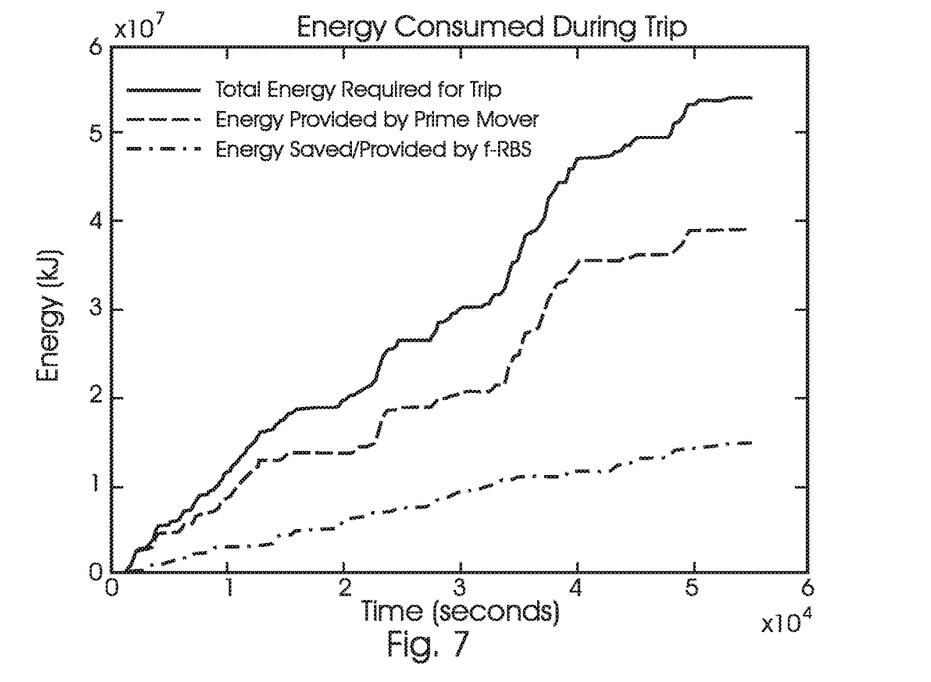
FIG. 7 shows a graphic representation of a simulated energy saving when using the system of FIG. 1.

The energy usage is represented graphically in FIG. 7. The top line indicates the total amount of energy used for motoring for the duration of the trip; this represents the amount of energy supplied by the locomotives without any regenerative braking system present. The centre line represents the decreased amount of energy required from the locomotives with the application of the brake system. The bottom line shows the energy recovered and supplied by the brake system, this represents the amount of energy that is saved for the trip.

The combination of all the brake system could perform 63.97% of all the braking required in the first scenario, and 56.63% of the braking in the second scenario. The overall efficiency of the brake system is 46.62%, meaning that on average 46.62% percent of the energy put into the system is delivered back to the train in the form of traction energy.

Figure 8:
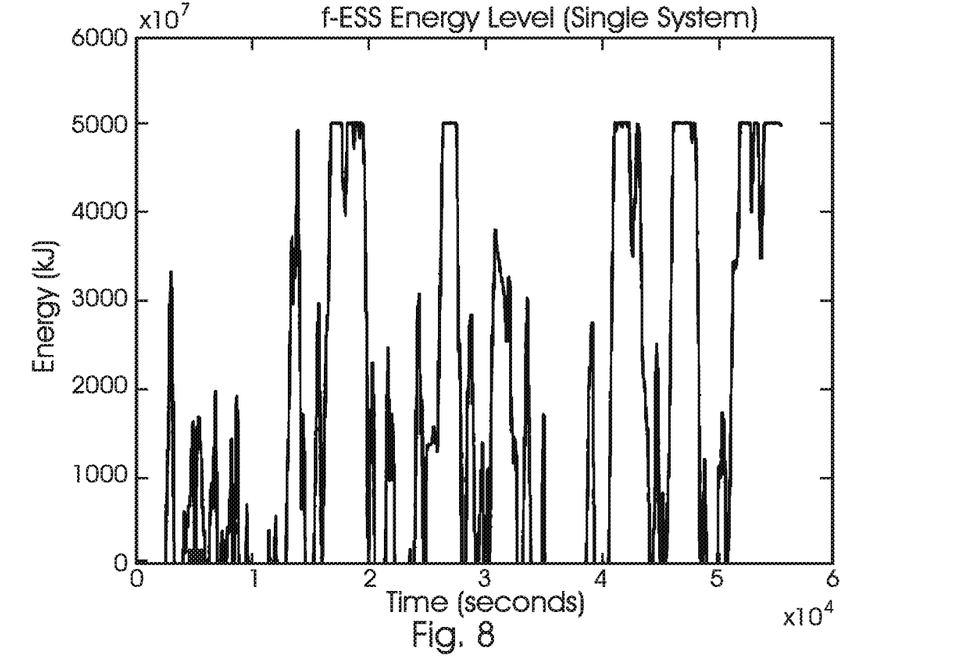
FIG. 8 shows a graphic representation of a simulated charge state of the ESS of each individual brake system of FIG. 1.

FIG. 8 shows the charge state of the ESS of each individual brake system for the first simulation. It is noted that the ESS is never saturated for extended periods, and also not saturated throughout the trip very often. The results for scenario 2 were very similar to the result shown in FIG. 8: ESS Charge State for Simulation 1. This is an indication that the selected ESS size is relatively good, an optimisation process will however have to be undergone to determine the best possible size of the ESS.

Figure 9:
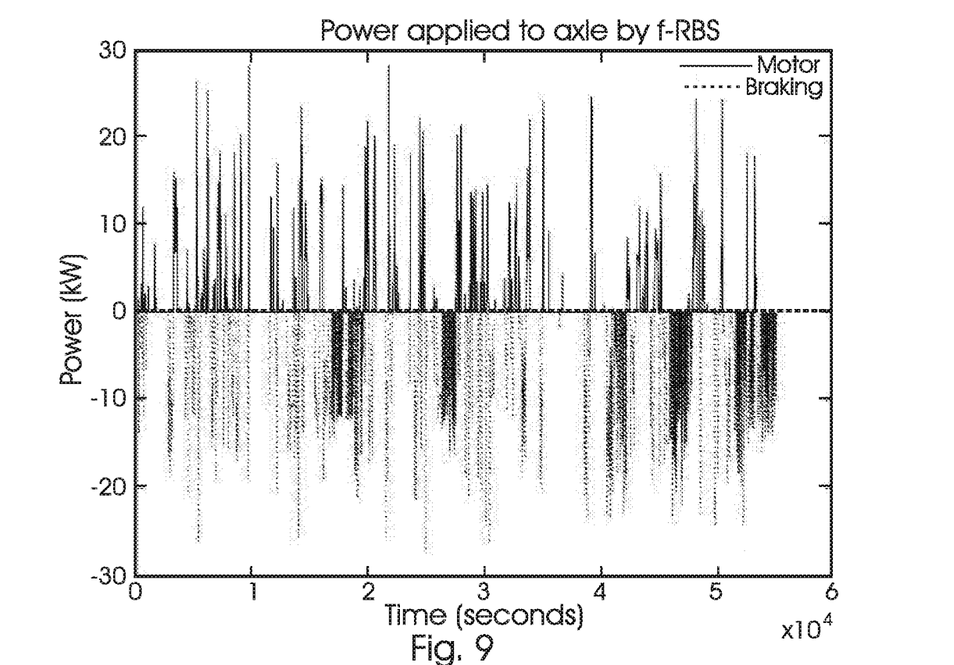
FIG. 9 shows a graphic representation of a power curve of a single brake system of FIG. 1.

Next, the power curve of a single brake system as seen in FIG. 9 is considered. It is important to monitor this parameter as it is desired to avoid high power peaks over the axle. FIG. 9 shows the results of the first scenario; the top line indicates the power applied during motoring operation which has a maximum value of 29 kW. The bottom line indicates the power during motoring operation and has a maximum absolute value of 27 kW. Both of these extreme values are reasonably low and within maximum allowable value of 35 kW.

Figure 10:
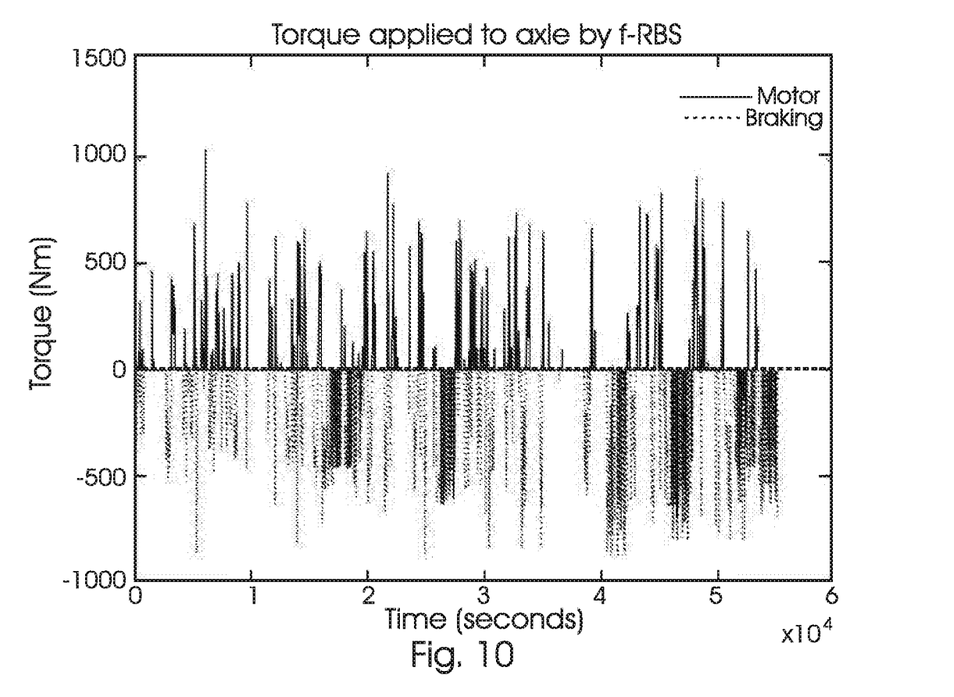
FIG. 10 shows a graphic representation of the torque applied to the axle during both motoring and braking operation of the system of FIG. 1.

FIG. 10 shows the torque applied to the axle during both motoring and braking operation for the first scenario, represented by the top- and bottom-lines respectively. The maximum applied torque during motoring is 1156 Nm while the maximum torque applied during braking is 832 Nm. Although these torque values are high, it is important to realise that this is the torque applied to the wheel axle, and not necessarily the torque that will be applied to the transmission. Referring back to the system layout in FIG. 1, the reduction gears before the CVT will reduce the torque by the same ration that it increases the angular velocity.

Figure 11:
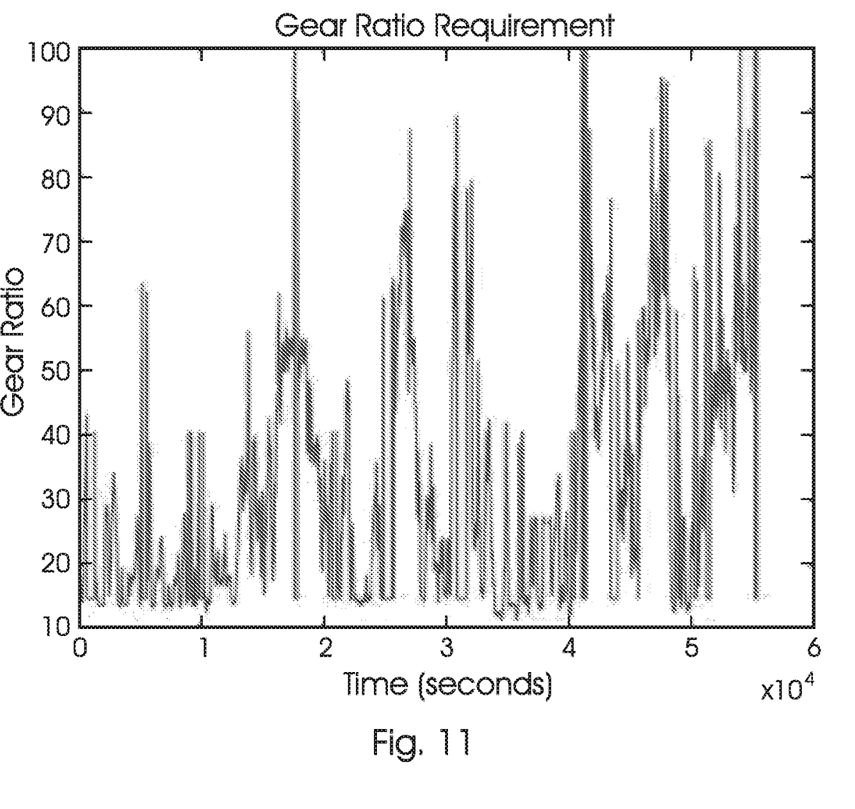
FIG. 11 shows a graphic representation of the required gear ratio between a flywheel of the system of FIG. 1 and the axle of the bogie.

Finally the results obtained for the required gear ratio between the flywheel and the axle are considered. FIG. 11 shows the obtained results obtained for the duration of the trip of the first scenario. The brake system was restricted to only operate when the train was moving at speeds in excess of 20 km/h. The maximum required gear ratio is 99.5, and the minimum gear ratio obtained is 11.7. It is worth noting that the maximum gear ratio was only required for a few instances. The results of the second scenario are almost identical to this with different upper and lower bounds.

Table 6 shows the results that are relevant to the powertrain of the brake system. The results show that for scenario two, the transmission system will require much higher torque and power ratings that for scenario one. The gear ratio requirements falls into a wider range for scenario two, but this can be mitigated if required by selecting a different flywheel.

TABLE 6

Transmission Requirements Results

| Parameter | Scenario 1 | Scenario 2 |
|---|---|---|
| Maximum Motoring Torque (N · m) | 872 | 1743 |
| Maximum Braking Torque (N · m) | 832 | 1668 |

TABLE 6-continued

Transmission Requirements Results

| Parameter | Scenario 1 | Scenario 2 |
|---|---|---|
| Maximum Motoring Power (kW) | 29.07 | 58.13 |
| Maximum Braking Power (kW) | 27.02 | 54.04 |
| Maximum Gear Ratio | 99.5 | 104.8 |
| Minimum Gear Ratio | 11.68 | 10.05 |

The invention claimed is:

1. A mechanical regenerative braking system for installation on a bogie of a non-powered railway vehicle, the regenerative system including:
    an energy storage system for storing energy in mechanical or kinetic form; wherein the energy storage system includes a flywheel mounted on an axle of the bogie by means of a bearing assembly that allows the flywheel to rotate independently from the axle of the bogie; wherein
    size of flywheel and angular velocity determine how much energy can be stored in the flywheel for later use;
    a transmission system which is selectively operable between different modes including:
        i) a braking mode in which it transmits mechanical or kinetic energy from the axle of the bogie to the energy storage system;
        ii) a drive mode in which it transmits mechanical or kinetic energy from the energy storage system to the axle of the bogie; wherein
        in the drive mode speed of the flywheel will reduce until it reaches the speed at which the system is fully discharged; wherein
        once a signal from the flywheel speed sensor indicates that the flywheel has reached the speed at which the system is fully discharged, the drive mode will be deactivated; and
        iii) an idle mode in which the energy storage system contains stored energy but is neither actively being further charged nor is applying a tractive effort to the axle of the bogie; and
    a control unit which is, in use, in communication with a prime mover and the transmission system so as to receive control signals from the prime mover and automatically operate the mode of the transmission system in response to the control signals.

2. The mechanical regenerative braking system according to claim 1, wherein the modes of the transmission system include:
    i) an isolation mode in which the transmission system is disengaged from the axle of the bogie and the energy storage system; and
    ii) a self-discharge mode in which the energy storage system is disengaged from the transmission system and energy, is dissipated from the energy storage system.

3. The mechanical regenerative braking system according to claim 1, wherein the non-powered vehicle is a railway wagon.

4. The mechanical regenerative braking system according to claim 1, wherein the transmission system is in the form of a continuously variable transmission (CVT).

5. The mechanical regenerative braking system according to 1, including a transmission-to-axle link for transmitting mechanical or kinetic energy between the axle of the bogie and the transmission system.

6. The mechanical regenerative braking system according to claim 1, wherein the energy storage system includes a flywheel.

7. The mechanical regenerative braking system according to claim 1, wherein the regenerative braking system includes a transmission-to-energy storage system link.

8. The mechanical regenerative braking system according to claim 1, wherein each axle of railway bogie includes the regenerative braking system installed on each axle of bogie, wherein the braking systems are operable independently from one another having its own braking system, transmission system and energy converters.

9. A regenerative energy management system for a train having a prime mover and a number of railway wagons, the energy management system including a number of regenerative braking systems according to claim 1 installed on each of the railway wagons, wherein control units of the regenerative braking systems are independently in communication with the prime mover.

10. A method of operating a regenerative braking system of a bogie of a non-powered railway vehicle, the system including an, energy, storage system for storing energy in mechanical or kinetic form; wherein the energy storage system includes a flywheel mounted on an axle of the bogie by means of a bearing assembly that allows the flywheel to rotate independently from the axle of the bogie; wherein size of flywheel and angular velocity determine how much energy can be stored in the flywheel for later use; a transmission system and a control unit for controlling a transmission system, the method including:
    receiving a control signal;
    switching between different modes of operation in response to the control signal, wherein different modes include the following:
        i) a braking mode in which the energy storage system is engaged with the transmission system in such a manner that a force is applied to wheels of the bogie acting in a direction braking the bogie wheels, thereby charging the energy storage system; wherein if axle speed velocity is larger than vehicle translational velocity, a torque applied by the braking system will be reduced or the system will disengage;
        ii) an idle mode in which the energy storage system contains stored energy but is neither actively being further charged nor is applying a tractive effort to the axle of the bogie; and
        iii) a drive mode in which the energy storage system is engaged with the transmission system in such a manner that a force is applied to the wheels of the bogie acting in a direction driving the bogie wheels; wherein a torque applied by the regenerative braking system is reduced during the drive mode if axle speed velocity is larger than the vehicle translational velocity; wherein in the drive mode speed of a flywheel will reduce until it reaches the speed at which the system is fully discharged; wherein once a signal from a flywheel speed sensor indicates that the flywheel has reached the speed at which the system is fully discharged, the drive mode will be deactivated, and wherein the driving mode may be deactivated by a speed sensor signal, measuring speed of a vehicle, indicating that the energy storage system is fully discharged.

11. A method according to claim 10, wherein the different modes further include:

iv) an isolation mode in which the transmission system is disengaged from the axle of the bogie and the energy storage system; and v) a self-discharge mode in which the energy storage system is disengaged from the transmission system and energy is dissipated from the energy storage system.

12. A method according to claim 11, wherein the isolation mode is activated by a signal that detects failure or defects in any system component.

13. The method according to claim 11, wherein the self-discharge mode is activated by a signal that detects a system component failure or by a signal that system components need to be shut down at the end of a journey.

14. The method according to claim 11, wherein the self-discharge mode is deactivated by a speed sensor signal indicating that the energy storage system has discharged.

15. The method according to claim 10, wherein the braking mode is activated by a signal from a lead locomotive during braking.

16. The method according to claim 10, including maintaining the torque that is applied to the axle of the bogie during the braking mode and/or driving mode by the regenerative braking system within a range ensuring that there is no slippage between the wheels of the bogie and rail.

17. The method according to claim 16, including monitoring the slippage by comparing vehicle translational velocity with velocity determined from wheel or axle speed of the bogie.

18. The method according to claim 17, including reducing the torque being applied by the regenerative braking system during the braking mode or driving mode if the axle speed velocity is larger than the vehicle translational velocity.

19. The method according to claim 10, wherein the braking mode is deactivated by a speed sensor signal, indicating that the energy storage system is fully charged.

20. The method according to claim 10, including measuring the coupler forces of the non-powered railway vehicle and deactivating the braking mode or driving mode when the coupler force signal is within a predetermined range.

21. The method according to claim 10, wherein the idle mode is activated by a signal that a train is coasting.

22. The method according to claim 10, including measuring the coupler forces, wherein the idle mode is activated when by a signal that the coupler forces are within a predetermined range.

23. The method according to claim 10, wherein the drive mode is activated by a signal that power is required.

24. The method according to claim 23, wherein the signal indicating that power is required is received from a lead locomotive.

* * * * *